(12) United States Patent
Sobel et al.

(10) Patent No.: US 8,112,806 B1
(45) Date of Patent: Feb. 7, 2012

(54) DETECTING NETWORK INTERFACE CARD LEVEL MALWARE

(75) Inventors: William E. Sobel, Jamul, CA (US); Sourabh Satish, Fremont, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 597 days.

(21) Appl. No.: 12/259,212

(22) Filed: Oct. 27, 2008

(51) Int. Cl.
G06F 11/00 (2006.01)

(52) U.S. Cl. ................ 726/24; 726/22; 726/23

(58) Field of Classification Search ............ 726/23, 726/22, 24
See application file for complete search history.

(56) References Cited

U.S. PATENT DOCUMENTS

| 2004/0128539 | A1* | 7/2004 | Shureih ............... 713/201 |
| 2005/0039104 | A1* | 2/2005 | Shah et al. ............ 714/776 |
| 2005/0210533 | A1* | 9/2005 | Copeland et al. ........ 726/23 |
| 2008/0101234 | A1* | 5/2008 | Nakil et al. ........... 370/235 |

OTHER PUBLICATIONS

Intel; "Intel 8255x 10/100 Mbps Ehternet Controller Family"; Open Source Software Developer Manual; Jan. 2006.

* cited by examiner

*Primary Examiner* — Mohammad Reza
(74) *Attorney, Agent, or Firm* — Brill Law Office; Jeffrey Brill

(57) ABSTRACT

Computers are monitored for malware communicating directly with the NIC. The infection of computers with NIC level malware is detected. Operating system level network packet transmission statistics are monitored, as are transmission counters maintained by the NIC. The operating system level transmission statistics are compared to the NIC level transmission counters for a given period of time. If the NIC counters indicate the occurrence of a greater number of transmissions than as is indicated by the operating system level statistics, it is concluded that the computer is infected with NIC level malware.

18 Claims, 2 Drawing Sheets

US 8,112,806 B1

DETECTING NETWORK INTERFACE CARD LEVEL MALWARE

TECHNICAL FIELD

This invention pertains generally to computer security, and more specifically to detecting malware that operates at the Network Interface Card level.

BACKGROUND

A new class of malware operates by bypassing the Network Driver Interface Specification (NDIS). The NDIS is an application programming interface (API) for network interface cards (NICs). It used in Microsoft Windows, and to varying extents is also supported in Linux and other operating systems. By writing directly to the NIC, the new class of malware can send and receive data on a host computer without detection.

More specifically, at Blackhat/Defcon 2008, Sherri Sparks and Shawn Embleton made a presentation titled "Deeper Door, exploiting the NIC chipset." This talk disclosed a type of root kit that bypasses NDIS by interacting directly with the NIC. By going below NDIS, to which Windows network interface drivers are written, the attack circumvents current software firewalls and intrusion detection systems. This is so because these security applications monitor packets at the NDIS level. The "Deeper Door" presentation described targeting the Intel 8255x chipset, which has open documentation, and with which many Intel cards are compatible. The described attack can both send and receive data without the NDIS layer being aware of the exploit. It would be desirable to address this security vulnerability, both for the Intel 8255x chipset and for other NIC hardware.

SUMMARY

Computers are monitored for malware communicating directly with the NIC. The infection of computers with NIC level malware is detected. Operating system level network packet transmission statistics are monitored, as are transmission counters maintained by the NIC. The operating system level transmission statistics are compared to the NIC level transmission counters for a given period of time. If the NIC counters indicate the occurrence of a greater number of transmissions than as is indicated by the operating system level statistics, it is concluded that the computer is infected with NIC level malware.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
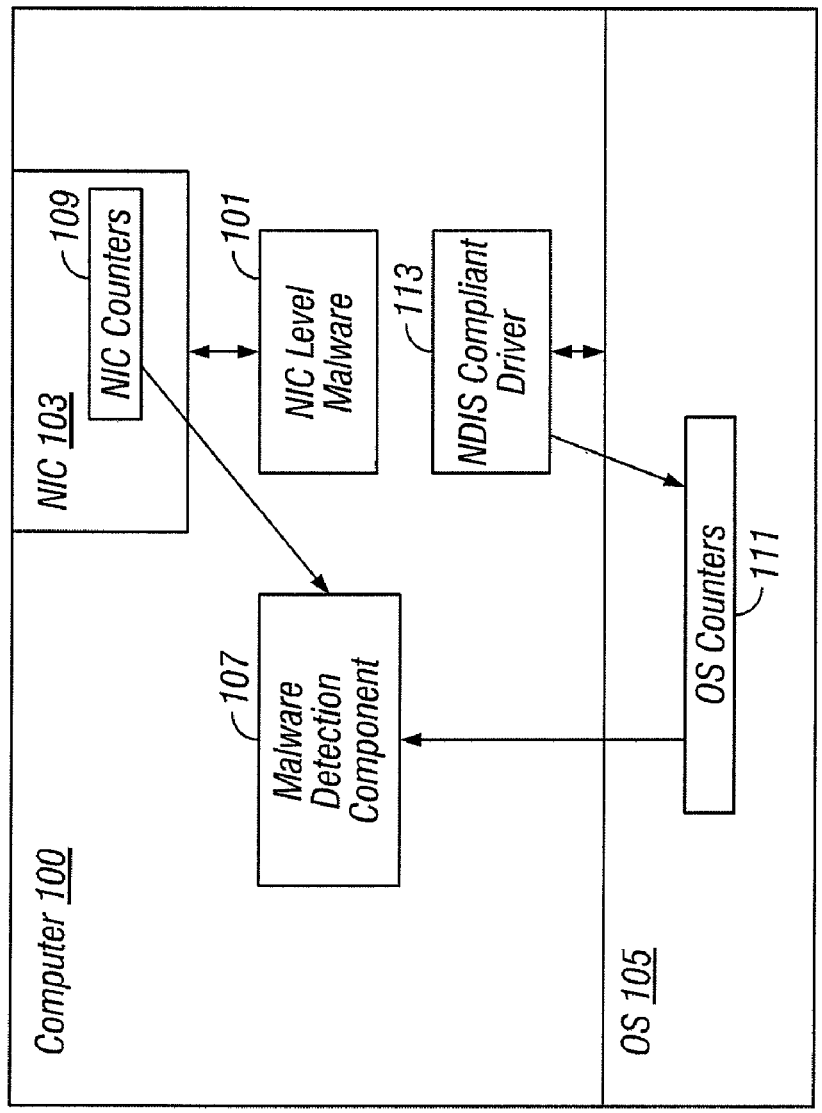
FIG. 1 is a block diagram illustrating a system for detecting malware that operates at the Network Interface Card level, according to some embodiments of the present invention.

FIG. 1 illustrates a system for detecting infection of a computer 100 by malware 101 operating at a Network Interface Card (NIC) 103 level, according to some embodiments of the present invention. It is to be understood that although various components are illustrated and described above as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

When the operating system (OS) 105 starts-up (either when the OS 105 is booted or when the OS 105 wakes from a sleep or hibernation state), a malware detection component 107 reads the send and receive counters 109 of the NIC 103. More specifically, the Intel 8255x chipset provides on-chip counters 109 that track a variety of events associated with both the transmission and receipt of data. These on-chip counters 109 are updated by the NIC 103 when it completes the processing of a frame. For example, after the completion of the transmission of a frame, the appropriate counter 109 is updated. Likewise, the relevant counter 109 is updated when a frame is received. The NIC 103 returns the counters 109 on demand in response to the issuing of a specific command (i.e., the Dump Statistical Counters command or the Dump and Reset Statistical Counters command in the SCB CUC field). By issuing an appropriate command, the malware detection component 107 reads the NIC's send and receive counters 109.

Because these counters 109 track send and receive information at a NIC 103 level, this information accounts for all packet transmission activity, whether it was executed by an NDIS compliant driver 113 or via the NIC 103 directly. It is to be understood that many NIC chipsets other than the Intel 8255x maintain similar counters 109, which can be accessed in similar manners, all within the scope of various embodiments of the present invention.

Additionally, the malware detection component 107 takes into account the OS 105 level network transmission statistics upon start-up of the OS 105. Many widely used OSs 105 maintain counters 111 of packets received and transmitted at an OS 105 level (e.g., by an NDIS compliant driver 113). In the context of such an OS 105, the malware detection component 107 reads the OS 105 level send and receive counters 111. All network transmission that occurs via an NDIS compliant driver 113 will be accounted for by these counters 109, 111. In the case of an OS 105 that does not provide such counters 111, the malware detection component 107 can track packets transmitted and received itself, by using standard OS 105 services. In embodiments in which the OS 105 does not maintain counters 111, the malware detection component 107 can utilize 0 (or another value) as the initial OS 105 level count.

The malware detection component 107 compares the NIC counters 109 and the OS counters 111 (or the malware detection component 107 determined initial OS 105 level count), and computes an initial delta if there is one. Because the nature of any transmission activity that may have occurred before the malware detection component 107 initially reads the NIC 103 and OS 105 level counters 109, 111 is unknown, in some embodiments the malware detection component 107 simply accepts this initial delta (if any) as a given. (In one embodiment, the malware detection component 107 interprets the existence of an initial delta as evidence of infection of the computer 100 by NIC 103 level malware 101.) The malware detection component 107 is loaded and makes its initial counter 109, 111 checks as soon as possible in the OS 105 boot or activation process, so as to avoid any undetectable, pre-monitoring transmission activity by malware 101 at a NIC 103 level.

After initially reading the counters 109, 111 and computing the initial delta, the malware detection component 107 checks both the NIC counters 109 and the OS counters 111 from time to time, while the OS 105 is loaded and active. (In embodiments in which the OS 105 does not maintain network transmission counters 111, the malware detection component 107 checks its own tracked OS 105 level network transmission statistics). How often to take these subsequent readings of the counters 109, 111 is a variable design parameter. When these update checks are made, the malware detection component 107 determines if there is a difference between the NIC counters 109 and the OS counters 111, taking into account any initial delta. Because all communication should be conducted by an NDIS compliant driver 113, and thus reflected in the OS counters 111, a greater number of detected transmissions at the NIC level 103 indicates infection of the computer 100 with Deeper Door type malware 101. In other words, if the NIC counters 109 indicate the occurrence of a greater number of transmissions than the OS counters 111, then it can be concluded that transmissions occurred that bypassed the NDIS compliant driver 113, and were conducted directly at a NIC 103 level. This is evidence that the computer 100 is infected by malware 101 that operates at a NIC 103 level. Responsive to detecting such a condition, the malware detection component 107 can generate an alert (e.g., to a user or a central security service or the like), activate an anti-malware application, or take other appropriate action as desired.

Figure 2:
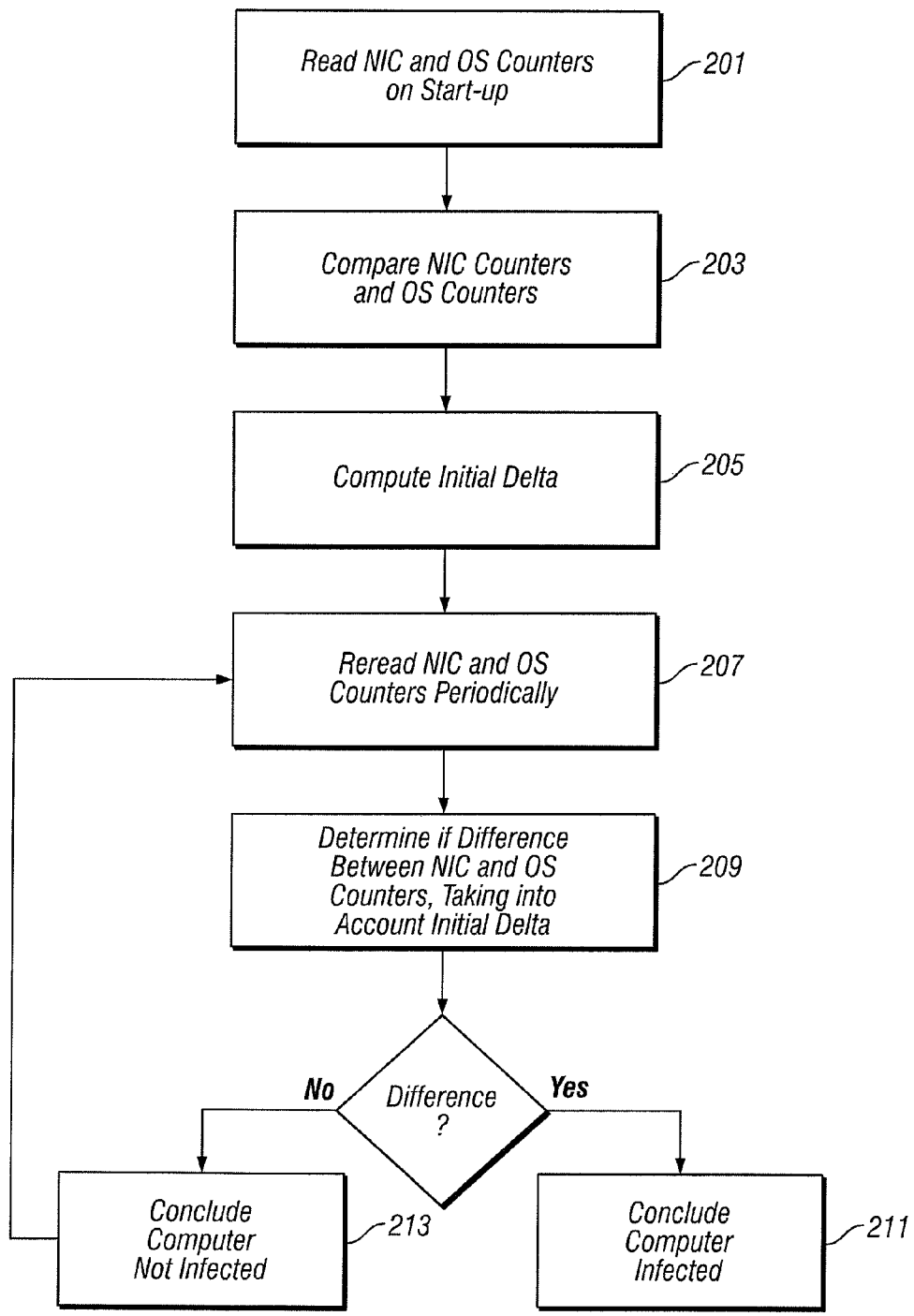
FIG. 2 is a flowchart illustrating steps for detecting the presence of Network Interface Card level malware on a computer, according to one embodiment of the present invention.

FIG. 2 illustrates steps for detecting the presence of NIC level malware 101 (FIG. 1) on a computer 100 (FIG. 1), according to one embodiment of the present invention. Upon startup of the OS 105 (FIG. 1), the malware detection component 107 (FIG. 1) reads 201 the send and receive counters 109 (FIG. 1) of the NIC 103 (FIG. 1) and the send and receive counters 111 (FIG. 1) of the OS 105 (FIG. 1). The malware detection component 107 (FIG. 1) compares 203 the NIC counters 109 (FIG. 1) and the OS counters 111 (FIG. 1), and computes 205 an initial delta between the two.

Subsequently, the malware detection component 107 (FIG. 1) checks 207 both the NIC counters 109 (FIG. 1) and the OS counters 111 (FIG. 1) periodically, and determines 209 if there is a difference between the two, taking into account the initial delta. If the NIC counters 109 (FIG. 1) indicate the occurrence of a greater number of transmissions than the number indicated by the OS counters ill (FIG. 1), the malware detection component 107 (FIG. 1) concludes 211 that the computer is infected with NIC level malware 101 (FIG. 1). On the other hand, if there is no such indication, the malware detection component 107 (FIG. 1) concludes 213 that the computer 100 (FIG. 1) is not infected with NIC level malware 101 (FIG. 1), in which case the process can continue from step 207 for as long as the OS 105 is active.

It is to be understood that while the above embodiments are discussed in terms of the Intel 8255x chipset, similar methodology can be applied to other network card hardware as desired. Additionally, although NDIS is discussed above, applying similar methodology to other OS 105 level network drivers is also within the scope of the present invention.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A computer implemented method for detecting infection of a computer by malware operating at a Network Interface Card level, the method comprising the steps of:
   upon operating system start-up, determining an initial quantification of network transmission activity that has occurred at a Network Interface Card level and an initial quantification of network transmission activity that has occurred at an operating system network driver level;
   calculating whether there is a difference between the initial quantification of network transmission activity that has occurred at the Network Interface Card level and the initial quantification of network transmission activity that has occurred at the operating system network driver level;
   determining at least one subsequent quantification of network transmission activity that has occurred at a Network Interface Card level since determining a most recent previous quantification of same, and at least one subsequent quantification of network transmission activity that has occurred at an operating system network driver level since determining a most recent previous quantification of same;
   calculating whether there is a difference between the at least one subsequent quantification of network transmission activity that has occurred at the Network Interface Card level and the at least one subsequent quantification of network transmission activity that has occurred at the operating system network driver level, taking into account any initial difference; and responsive to results of at least one of the calculating steps, determining whether the computer is infected by malware operating at a Network Interface Card level.

2. The method of claim 1 wherein upon operating system start-up further comprises a condition from a group of conditions consisting of:
   upon booting of the operating system;
   upon the operating system waking from a hibernation state;
   upon the operating system waking from a sleep state;
   upon activation of an operating system in a hibernation state; and
   upon activation of an operating system in a sleep state.

3. The method of claim 1 wherein determining a quantification of network transmission activity that has occurred at a Network Interface Card level further comprises:
   reading counters of the Network Interface Card.

4. The method of claim 1 wherein determining an initial quantification of network transmission activity that has occurred at an operating system network driver level further comprises performing at least one step from a group of steps consisting of:
   reading counters of the operating system; and
   utilizing a default value.

5. The method of claim 1 wherein determining a subsequent quantification of network transmission activity that has occurred at an operating system network driver level further comprises performing at least one step from a group of steps consisting of:
   reading counters of the operating system; and
   tracking operating system network driver level network transmission activity.

6. The method of claim 1 wherein responsive to results of at least one of the calculating steps, determining whether the computer is infected by malware operating at a Network Interface Card level further comprises performing at least one step from a group of steps consisting of:
   determining that the computer is infected by malware, responsive to determining that there is a difference between at least one subsequent quantification of network transmission activity that has occurred at the Network Interface Card level and at least one subsequent quantification of network transmission activity that has occurred at the operating system network driver level, taking into account any initial difference;
   determining that the computer is not infected by malware, responsive to determining that there is not a difference between at least one subsequent quantification of network transmission activity that has occurred at the Network Interface Card level and at least one subsequent quantification of network transmission activity that has occurred at the operating system network driver level, taking into account any initial difference; and
   determining that the computer is infected by malware, responsive to determining that there is a difference between the initial quantification of network transmission activity that has occurred at the Network Interface Card level and the initial quantification of network transmission activity that has occurred at the operating system network driver level, taking into account any initial difference.

7. The method of claim 6 further comprising performing a step from a group of steps consisting of:
   responsive to determining that the computer is infected by malware, alerting a user;
   responsive to determining that the computer is infected by malware, transmitting an alert to a central security service; and
   responsive to determining that the computer is infected by malware, activating an anti-malware application.

8. The method of claim 1 wherein:
   the Network Interface Card is based on an Intel 8255x chipset.

9. The method of claim 1 wherein:
   the operating system network driver is compliant with Network Driver Interface Specification.

10. A non-transitory computer readable medium storing program codes for detecting infection of a computer by malware operating at a Network Interface Card level, the non-transitory computer readable medium comprising:
    program code for, upon operating system start-up, determining an initial quantification of network transmission activity that has occurred at a Network Interface Card level and an initial quantification of network transmission activity that has occurred at an operating system network driver level;
    program code for calculating whether there is a difference between the initial quantification of network transmission activity that has occurred at the Network Interface Card level and the initial quantification of network transmission activity that has occurred at the operating system network driver level;
    program code for determining at least one subsequent quantification of network transmission activity that has occurred at a Network Interface Card level since determining a most recent previous quantification of same, and at least one subsequent quantification of network transmission activity that has occurred at an operating system network driver level since determining a most recent previous quantification of same;
    program code for calculating whether there is a difference between the at least one subsequent quantification of network transmission activity that has occurred at the Network Interface Card level and the at least one subsequent quantification of network transmission activity that has occurred at the operating system network driver level, taking into account any initial difference; and
    program code for, responsive to results of at least one of the calculating steps, determining whether the computer is infected by malware operating at a Network Interface Card level.

11. The non-transitory computer readable medium of claim 10 wherein upon operating system start-up further comprises a condition from a group of conditions consisting of:
    upon booting of the operating system;
    upon the operating system waking from a hibernation state;
    upon the operating system waking from a sleep state;
    upon activation of an operating system in a hibernation state; and
    upon activation of an operating system in a sleep state.

12. The non-transitory computer readable medium of claim 10 wherein the program code for determining a quantification of network transmission activity that has occurred at a Network Interface Card level further comprises:
    program code for reading counters of the Network Interface Card.

13. The non-transitory computer readable medium of claim 10 wherein the program code for determining an initial quantification of network transmission activity that has occurred at an operating system network driver level further comprises program code for performing at least one step from a group of steps consisting of:
- reading counters of the operating system; and
- utilizing a default value.

14. The non-transitory computer readable medium of claim 10 wherein the program code for determining a subsequent quantification of network transmission activity that has occurred at an operating system network driver level further comprises program code for performing at least one step from a group of steps consisting of:
- reading counters of the operating system; and
- tracking operating system network driver level network transmission activity.

15. The non-transitory computer readable medium of claim 10 wherein the program code for, responsive to results of at least one of the calculating steps, determining whether the computer is infected by malware operating at a Network Interface Card level further comprises program code for performing at least one step from a group of steps consisting of:
- determining that the computer is infected by malware, responsive to determining that there is a difference between at least one subsequent quantification of network transmission activity that has occurred at the Network Interface Card level and at least one subsequent quantification of network transmission activity that has occurred at the operating system network driver level, taking into account any initial difference;
- determining that the computer is not infected by malware, responsive to determining that there is not a difference between at least one subsequent quantification of network transmission activity that has occurred at the Network Interface Card level and at least one subsequent quantification of network transmission activity that has occurred at the operating system network driver level, taking into account any initial difference; and
- determining that the computer is infected by malware, responsive to determining that there is a difference between the initial quantification of network transmission activity that has occurred at the Network Interface Card level and the initial quantification of network transmission activity that has occurred at the operating system network driver level, taking into account any initial difference.

16. The non-transitory computer readable medium of claim 15 further comprising program code for performing a step from a group of steps consisting of:
- responsive to determining that the computer is infected by malware, alerting a user;
- responsive to determining that the computer is infected by malware, transmitting an alert to a central security service; and
- responsive to determining that the computer is infected by malware, activating an anti-malware application.

17. The non-transitory computer readable medium of claim 10 wherein:
- the Network Interface Card is based on an Intel 8255x chipset.

18. The non-transitory computer readable medium of claim 10 wherein:
- the operating system network driver is compliant with Network Driver Interface Specification.

* * * * *

UNITED STATES PATENT AND TRADEMARK OFFICE
CERTIFICATE OF CORRECTION

| | | |
|---|---|---|
| PATENT NO. | : 8,112,806 B1 | Page 1 of 1 |
| APPLICATION NO. | : 12/259212 | |
| DATED | : February 7, 2012 | |
| INVENTOR(S) | : William E. Sobel, Sourabh Satish and Bruce McCorkendale | |

It is certified that error appears in the above-identified patent and that said Letters Patent is hereby corrected as shown below:

Title Page, Item [56] List of Other Publications, replace ""Ehternet" with "Ethernet"

Col. 1, line 15, replace "it used" with "it is used"

Signed and Sealed this

Seventeenth Day of April, 2012

David J. Kappos
*Director of the United States Patent and Trademark Office*